United States Patent

[11] 3,628,189

| [72] | Inventors | Michael A. Marroni, Jr.<br>Weatogue;<br>Douglas E. Getchell, Windsor Locks, both of Conn. |
|---|---|---|
| [21] | Appl. No. | 48,946 |
| [22] | Filed | June 22, 1970 |
| [45] | Patented | Dec. 21, 1971 |
| [73] | Assignee | United Aircraft Corporation<br>East Hartford, Conn.<br>Continuation of application Ser. No. 785,612, Dec. 20, 1968, now abandoned. This application June 22, 1970, Ser. No. 48,946 |

[54] PRESSURE SUIT LOAD-RELIEVED SIZE-ADJUSTMENT JOINTS
3 Claims, 9 Drawing Figs.

[52] U.S. Cl. .................................................. 2/2.1 A
[51] Int. Cl. ........................................... A62b 17/00
[50] Field of Search ............................ 2/2, 2.1 R, 2.1 A, 67, 68, 159, 162; 138/120, 121; 285/226

[56] References Cited
UNITED STATES PATENTS

| 2,410,632 | 11/1946 | Colley et al. | 2/2.1 A |
| 2,417,177 | 3/1947 | Richou | 2/2.1 A |
| 2,966,155 | 12/1960 | Krupp | 2/2.1 A |
| 2,967,305 | 1/1961 | White et al. | 2/2.1 A |
| FOREIGN PATENTS | | | |
| 977,172 | 12/1964 | Great Britain | 2/2.1 R |

*Primary Examiner*—Jordan Franklin
*Assistant Examiner*—George H. Krizmanich
*Attorney*—Melvin Pearson Williams ABSTRACT: Plug loads in a pressurized suit are transmitted across size-adjusting joints in order to relieve convolute distortion which increases the torque required for flexing the various portions of the pressurized suit. In a first arm embodiment, the plug load restraint terminates in a rigid arm ring; in a second arm embodiment, the plug load restraint terminates in an eyelet which is laced in a fanned out fashion to the opposite side of the adjustment joint, thereby to spread the load to a substantially rigid wrist ring. In a leg embodiment, the plug load restraint of the knee section is joined to a plug load restraint of an ankle section directly, by an adjustable strap, the ankle section terminating in a load-distributing member near the sole of the boot.

PATENTED DEC 21 1971

INVENTORS
MICHAEL H. MARRONI, JR.
DOUGLAS E. GETCHELL

BY Melvin Pearson Williams
ATTORNEY

PRESSURE SUIT LOAD-RELIEVED SIZE-ADJUSTMENT JOINTS

This application is a continuation of application Ser. No. 785,612, filed Dec. 20, 1968, now abandoned.

BACKGROUND OF THE INVENTION

1. Field of Invention

This invention relates to pressurized suits such as those used in high altitude aviation and space exploration, and more particularly to size-adjusting joints therein.

2. Description of the Prior Art

It has been determined from long years of experience that pressurized suits of the type used in high altitude aviation and space exploration become extremely rigid when under pressure. In order to provide mobility of such suits, recent advances in the art have utilized a high tensile strength restraining fabric in various sorts of convoluted configurations together with extremely carefully designed joints and transitions. However, many of the space suits known to the prior art still require so much torque in order to accomplish flexion and rotation of the various limbs that the freedom of motion of the wearer is severely limited, and the torque required for performing the various motions while in the pressurized suit is so high that the wearer becomes extremely fatigued in a very short time.

SUMMARY OF THE INVENTION

The object of the present invention is to reduce the torque required for flexing and rotating portions of a pressurized suit.

According to the present invention, it has been found that convoluted sections of a pressurized restraining cloth space suit resists flexing when the convolutes are not parallel with one another more than they do when the convolutes are parallel. According further to the present invention, the tendency of convolutes to buckle as a result of plug load restraints terminated near the convolutes at one side of a size-adjusting joint is eliminated by transmitting the plug load directly through the joint other than through the size adjusting members thereof. In still further accord with the present invention, the transmitted plug load is variably distributed on the member at which it is terminated, and the termination is chosen in such a fashion to not cause further buckling.

The present invention provides for ease of mobility in a space suit by relieving the forces of distorted convolutes so as to permit flexing with less torque. Additionally, increased suit life and reliability are provided.

Other objects, features and advantages of the present invention will become more apparent in the light of the following detailed description of preferred embodiments thereof, as illustrated in the accompanying drawing.

BRIEF DESCRIPTION OF THE DRAWING

FIG. 9 is an elevation of another embodiment.

DESCRIPTION OF THE PREFERRED EMBODIMENT

Figure 1:
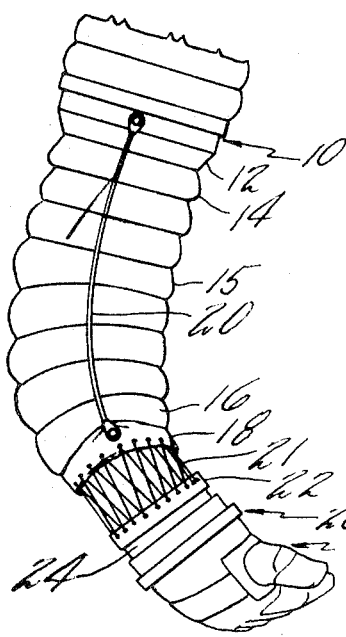
FIG. 1 is a side elevation of an elbow and wrist portion of a pressurized suit typical of the prior art.

For illustrative purposes herein, an exemplary size-adjusting joint known to the prior art is illustrated in FIG. 1. Therein, a lower shoulder swivel bearing 10 is attached to a cloth elbow joint comprising a transition piece 12 and a plurality of convolutes 14–16. These convolutes may be suitably formed of restraining cloth, or otherwise as is known in the art. A cylindrical section 18 is disposed to the convolute 16. A plug load restraining cable 20 is connected between the bearing 10 and the cylindrical section 18, and prevents the elongation of the elbow section as a result of plug load forces caused by pressure within the suit. The cylindrical section 18 is laced with cords 21 to another cylindrical section 22, which is attached by a transition piece 24 to a wrist ring 26. The wrist ring 26 may be suitably disposed to a glove assembly 28 as is known in the art. The cable 20 may be disposed to be convolutes 14–16 in any fashion known to the art, and may be enclosed in cloth if desired.

As can be seen with respect to the illustrative prior art elbow and wrist combination shown in FIG. 1, the tension in the plug load restraining cable 20 tends to pull the cylindrical section 18 upwardly at the center thereof, causing a distortion of the convolutes 16 through 15 (in contrast with the convolutes nearer to the lower shoulder bearing 10, such as convolute 14, which is substantially parallel and undistorted). It has been found that the distortion of the convolutes 15–16 causes the convolutes to resist flexure with a much higher degree than is true of parallel convolutes. The distortion of the convolutes as shown in FIG. 1 causes them to be disposed in a sufficiently slip-shod fashion so that the pressure distribution between various portions thereof is altered and resists forming breaking lines at the inside of a flexure. This results in a higher torque requirement in order to flex the elbow, and otherwise hampers mobility of the arm. It should be noticed that distortion does not occur in the cylindrical member 22 since it is very closely spaced with respect to a rigid ring 26.

The opposite side of the arm is similarly disposed with a plug load restraining cord and is very similar in appearance to the view shown in FIG. 1, and has been eliminated herefrom for simplicity.

Figure 2:
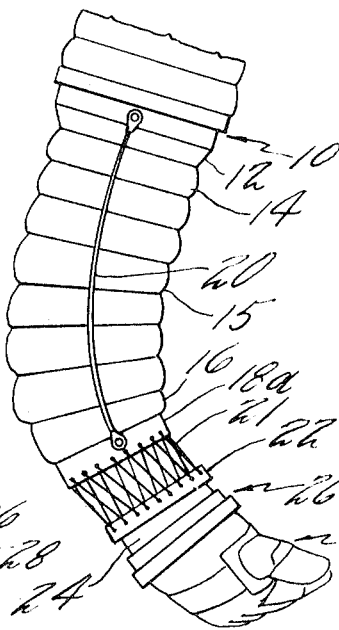
FIG. 2 is a side elevation of an elbow and wrist portion of a pressurized suit in accordance with a first embodiment of the present invention.

In accordance with the invention herein, as illustrated in an exemplary embodiment in FIG. 2, the plug load restraining cable 20 is terminated in a cylindrical rigid ring 18a, in contrast with the cloth cylindrical piece 18 of FIG. 1. This cylindrical section 18a may be formed of metal or of a suitably rigid plastic. In this embodiment, the plug load force is distributed by the ring 18a evenly throughout its circumference so as to avoid the pulling which attends the size adjusting joint of the prior art illustrated in FIG. 1.

Figure 3:
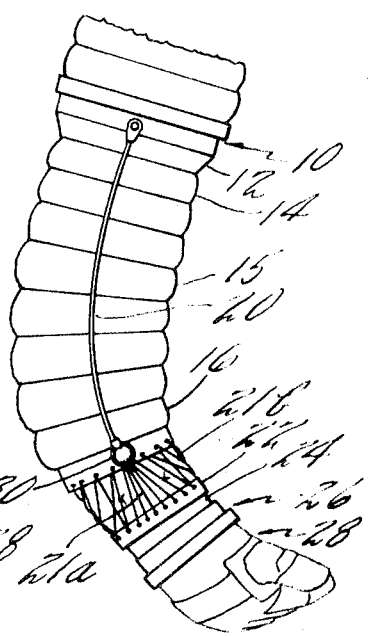
FIG. 3 is a side elevation of an elbow and wrist portion of a pressurized suit in accordance with a second embodiment of the present invention.

In another embodiment of the invention, as shown in FIG. 3, the plug load restraining cable 20 is terminated in an eyelet 30 which is specially laced by cords 21a to the cylindrical member 22, and laced by other cords 21b between a cloth cylindrical member 18b and the cylindrical member 22. In this embodiment, the cylindrical member 18b may comprise soft cloth, as is true in the prior art size-adjusting joint illustrated in FIG. 1, but the load is distributed directly across the joint to the member 22 by load-distributing cords 21a so as not to distort the joint.

Figure 4:
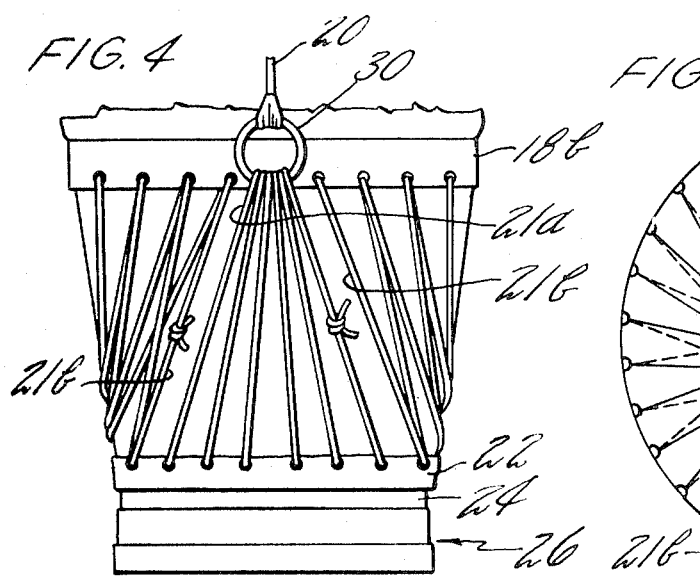
FIG. 4 is a detailed elevation view of the size-adjusting joint shown in the embodiment of FIG. 3.
Figure 5:
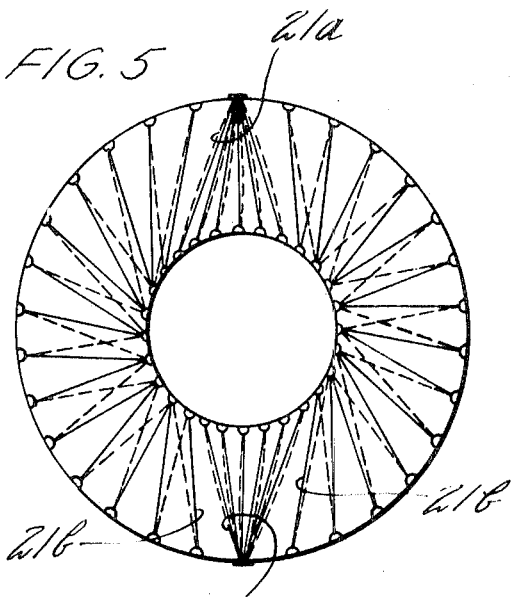
FIG. 5 is a diagrammatic illustration of the cord-lacing arrangement in the embodiment of FIGS. 3 and 4.

The details of the lacing arrangement of the cords 21a and 21b with respect to the eyelet 30 and the cylindrical members 18b and 22 as illustrated in FIGS. 4 and 5 being an end view which is distorted in order to clearly show the positions of the various cords. The cords shown solid appear towards the viewer, whereas the cords shown dotted are in back of the ones shown solid. Of course, the lacing of the cords 21b may vary somewhat to suit any particular utilization of the present invention, the criterion herein being simply to fan out the cords 21a between the eyelet 30 and the cylindrical member 22 in order to distribute the load along a substantial length of the member 22.

In operation, the cords 21b and the cords 21a must each be suitably adjusted so that all of the cords are under substantially the same tension when the suit is pressurized and the joint is adjusted for the desired length.

Figure 6:
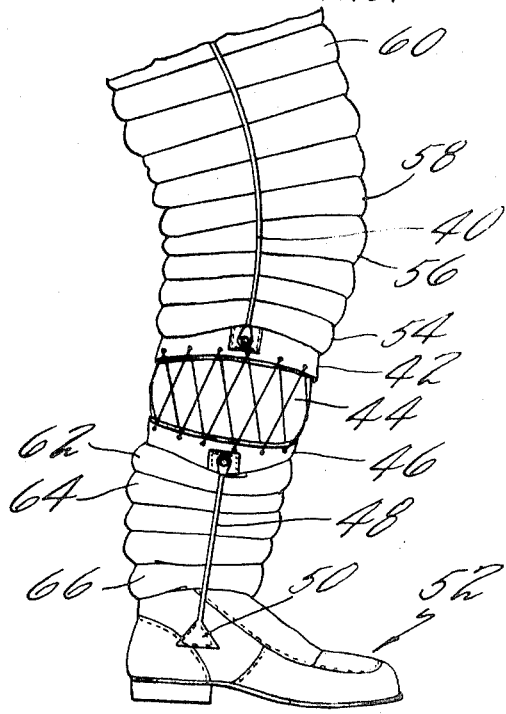
FIG. 6 is a side elevation view of a knee and ankle portion of a pressurized suit in accordance with the prior art.
Figure 7:
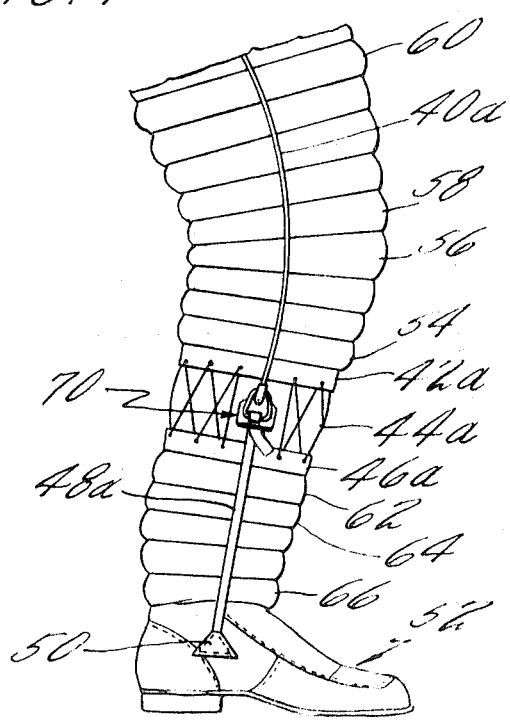
FIG. 7 is a side elevation view of a knee and ankle portion of a pressurized suit in accordance with the present invention.
Figure 8:
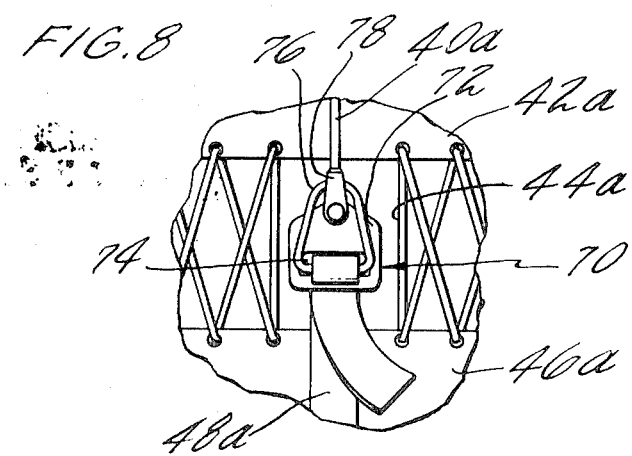
FIG. 8 is a detail elevation view of the size-adjusting joint illustrated in FIG. 7.

The invention also incorporates improvement in leg designs, as illustrated in FIGS. 6–8. Referring to FIG. 6, a plug load restraining cable 40 extends from a point upward of the knee to a point below the knee and terminates on a cylindrical member 42. This member is laced with cords 44 to a companion cylindrical member 46 to which is attached an ankle-restraining cable 48. The other end of cable 48 terminates at some point 50 in a boot assembly 52. In a fashion similar to that described with respect to FIGS. 1–5 hereinbefore, a number of convolutes 54–56 are distorted in contrast with convolutes 58–60 which are substantially parallel when in an unflexed position. This is due, as described hereinbefore, to the upward pull of the plug load restraining cable 40 against the cylindrical member 42 which causes distortion of the convolutes 54–56. Similarly, a downward pull exerted by plug load restraining cable 48 on cylindrical member 46 pulls at least a pair of convolutes 62, 64 out of shape, the effect of which may even be felt at the lower most convolute 66 at the point where the convoluted angle section joins the top of the boot assembly. In fact, the net effect is to pull the convolutes 62–66 down into the boot, causing a biting action on the foot of the wearer whenever the ankle is flexed. Additionally, it requires a high torque in order to manipulate the ankle as a result of the distortion of the convolutes 62–66. Further, knee flexure is hampered by the distortion in convolutes 54–56 as a result of these convolutes being pulled upwardly by the force exerted by the plug load restraining cable 40.

In a fashion similar to that described hereinbefore with respect to the elbow and wrist, it has been found that the torque required in order to accommodate flexure at the knee and ankle is lowered by maintaining the convolutes in the leg parallel and undistorted. In accordance with another embodiment of the invention illustrated in FIGS. 7 and 8, the restraining cables 40a and 48a are joined directly together by a buckle assembly 70, rather than terminating at cylindrical members 42a and 46a of a size-adjusting joint. The details of this assembly are shown more clearly in FIG. 8. The upper plug load restraining cable 40a terminates on a plate 72 which has a slot 74 for receiving a belt or tape, which may comprise the lower plug load restraining cable 48a. The slotted plate 72 together with a ringlet 76 which is looped over a swaged fitting 78, or other terminating piece for the upper plug load restraint cable 40a, forms a buckle. The lower restraint cable 48a may preferably comprise a restraint tape made up of several layers of restraint cloth sewn to form a belt or web suitable to resist the tensile forces required. This is convenient because then the lower restraint cable or tape 48a may be threaded through the buckle assembly 70 in the same fashion as well-known automobile seat belts are fastened to the anchor plates at the floor of an automobile. Since this is well known to the art, details of this threading are not shown herein for simplicity.

In the embodiments of FIGS. 7 and 8, the plug load restraint is transmitted directly from the cable 40a through the cable or belt 48a to the plate 50 which is so disposed that it tends to distribute these forces near the sole and heel of the boot assembly 52. This eliminates the tendency to pull convolutes up into the knee or downwardly toward the boot as a result of transmitting forces through the size-adjusting joint, as is true in prior art devices such as that shown in FIG. 6.

Referring to FIG. 9, another embodiment of the invention, which is similar to that of FIGS. 3–5, employs four groups of lacing, three of which 80–82 are illustrated. Each of these is tied off separately from the other. Group 81, and a group diametrically opposite thereto (not shown herein), are directly in line with the lateral restraint cable 20 and may therefore be adjusted with greater tension than are group 80 and 82. In the embodiment of FIG. 9 the spacing of holes in the cylindrical member 18c differs from that in the member 22, in that spaces are provided between various groups 80–82 to permit orthogonal lacing in a generally tapered joint.

In the embodiments of FIGS. 3–5 and of FIGS. 7–9, not only is the distortion of convolutes avoided, but since primary plug load restraint is transmitted across the joint without involving the joint directly, the tendency of the joint to distort as a result of other motions in the body is minimized. This is because of the fact that once the joint is laced to size and the suit is under pressure, it becomes a substantially rigid cylindrical section of the particular size to which it has been adjusted. It responds substantially as a rigid cylindrical section, and does not tend to alter its shape or size as a result of flexure of the various parts of the body. In contrast, even the embodiment shown in FIG. 2 may tend to distort slightly at the joint itself as a result of flexure in the wrist and/or the elbow since skewed loads are thereby transmitted to all of the cords making up the lacing of the size-adjusting joint.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. In a pressurized suit, a size-adjusting joint comprising:
   a suit portion including first and second spaced substantially cylindrical sections, at least a first one of said sections comprising convolutes of restraint fabric and having a lateral plug load restraint means affixed thereto, said suit portion including lacing means, each of said sections including means therearound receiving said lacing means at mutually facing respective ends thereof; said lacing means including a cord laced between said sections joining the same together forcing a joint, the lacing of said cord being adjustable to vary the distance between said sections, and thereby the size of said suit portion; and
   load-distributing means for adjustably connecting the lateral plug load restraint means of said first section across the joint formed by said cord to the second one of said sections, said load-distributing means fanning out from said load restraint means to said second section, thereby to distribute the plug load force in said lateral restraint means over a circumferential portion of said second section.

2. The size-adjusting joint according to claim 1 wherein said load-distributing means comprises:
   restraint lacing cord receiving means affixed to one end of said lateral plug load restraint means adjacent to the joint between said sections; and
   said lacing means including a second cord laced between said restraint lacing cord-receiving means and the other one of said sections, said second cord fanning out of from said restraint lacing cord-receiving means along a substantial portion of said second section, said second cord being laced more tightly than said first cord.

3. The size-adjusting joint according to claim 1 wherein said load-distributing means comprises an adjustable strap buckle means affixed to one end of said lateral plug load restraint means adjacent to the joint between said sections; and
   said second section having a lateral plug load restraint strap affixed in a fan out fashion to a substantial portion of said second section, said strap engaged by said buckle.

* * * * *